United States Patent
Heindorff

[15] 3,657,498
[45] Apr. 18, 1972

[54] RAIN-RESPONSIVE WATER SPRINKLING SYSTEM ELECTRIC CONTROL

[72] Inventor: Carl Heindorff, 4839 Sheridan Road, Racine, Wis. 53403

[22] Filed: Dec. 28, 1970

[21] Appl. No.: 101,517

[52] U.S. Cl. .......................................200/61.04, 200/85 R
[51] Int. Cl. ...........................................................H01h 3/02
[58] Field of Search....................200/61.04, 85 R, 61.07; 137/408, 577

[56] References Cited

UNITED STATES PATENTS

| | | | |
|---|---|---|---|
| 2,843,693 | 7/1958 | Scriver | 200/61.04 X |
| 1,949,364 | 2/1934 | Ball | 137/577 X |
| 2,856,476 | 10/1958 | Kaiser et al. | 200/61.04 |
| 1,217,036 | 2/1917 | McManus | 200/85 R |
| 2,705,168 | 3/1955 | Cody | 200/85 R X |
| 3,309,474 | 4/1967 | Heinrich | 200/61.07 |

Primary Examiner—Robert K. Schaefer
Assistant Examiner—M. Ginsburg
Attorney—Arthur J. Hansmann

[57] ABSTRACT

An electric switch electrically connected to a timer which controls a lawn and gardening watering system. A balance beam operates the switch and has an adjustable weight on one end and a rain receiving cup on the other end such that when a certain supply of rain water is in the cup, the beam is over-balanced to a point where the switch is open and thus the system will not operate to sprinkle water. The cup has an overflow means in the nature of a stand pipe therein to limit the amount of water and thus limit the time during which the switch can remain open, and the cup also has an evaporating member for assisting in the evaporation of the water collected in the cup. An accumulator cup is disposed remotely of the switch and balance beam cup, and this accumulator cup collects the rain water and directs it to the balance beam cup. The two cups are of the same size so the depth of rain water in the balance beam cup can be known and determined in in accordance with the amount of rainfall, and the over-flow pipe is adjustable to also determine the operation of the switch in accordance with the amount of rainfall. A guard is disposed over the balance beam cup section of the device so that the water can evaporate from the cup but bugs, debris, and the like cannot enter the cup to affect the point of balance.

6 Claims, 3 Drawing Figures

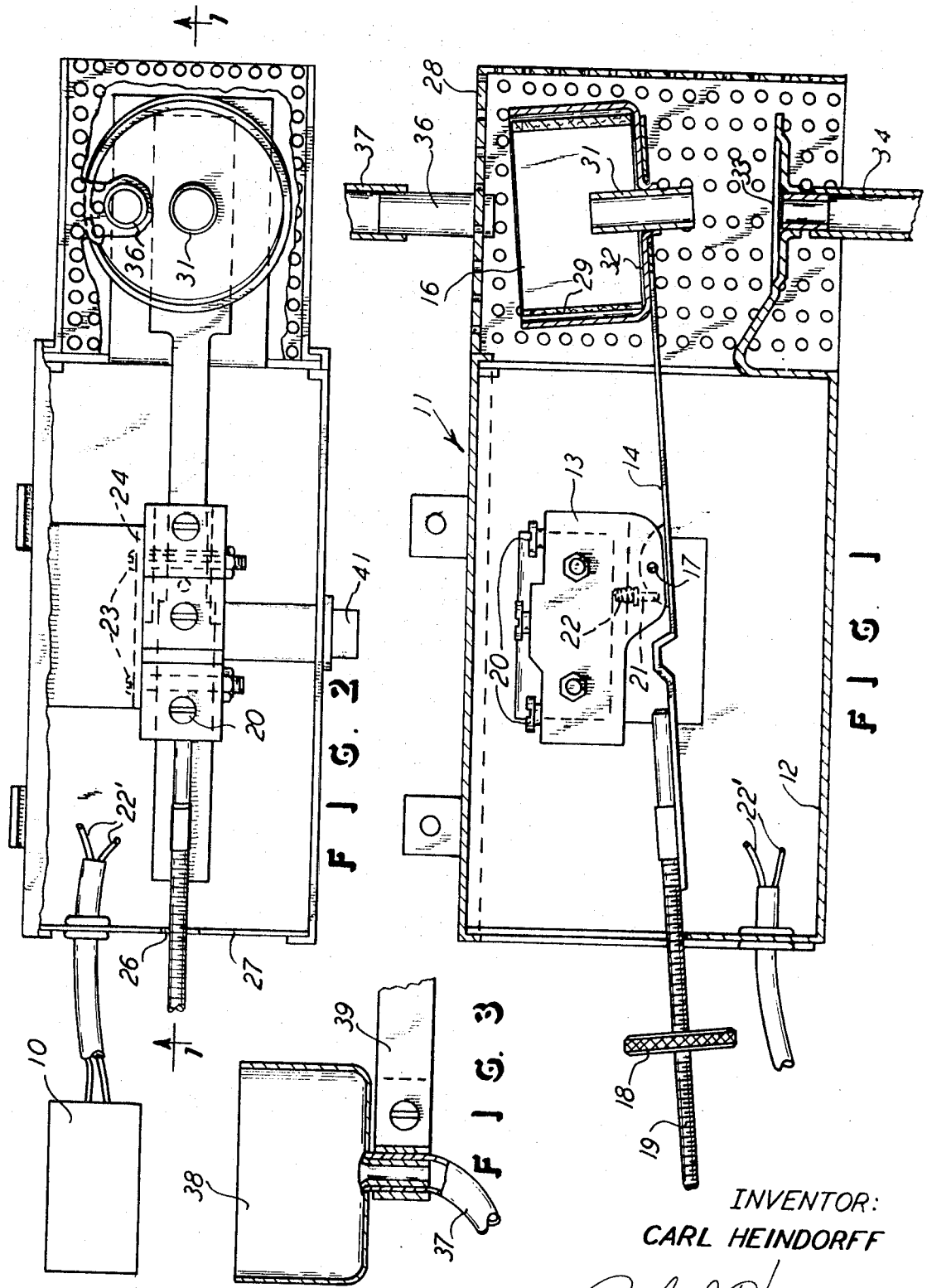
INVENTOR:
CARL HEINDORFF
Arthur J. Hansmann
ATTORNEY

RAIN-RESPONSIVE WATER SPRINKLING SYSTEM ELECTRIC CONTROL

This invention relates to a rain-responsive water sprinkling system electric control, and more particularly, it relates to a water sprinkling system electric control which is useful in controlling the function of a sprinkling system which is intended to be automatically controlled, rather than have an attendant in daily supervision of the system.

BACKGROUND OF THE INVENTION

Electric controls for water systems are already commonly known. These controls are of the nature which electrically connect to an electric timer which in turn controls the water valve for turning the system on and off, all in accordance with the occurance and the amount of rainfall. Some of these prior art systems utilize electric control switches which in turn are operated by water accumulators which receive the rain water and in turn set the switch in either an off or on position. Still further, these prior art controls utilize pivot members or balance beams which have an accumulator cup on one end for receiving the rain water and which have adjusting means so that the switch is operative in accordance with a certain depth of water accumulated in a cup. However, the prior art does not show a control which has the feature of governing the function of the water system in direct relationship to the amount of rainfall, or of being able to adjust the control so that it will be more accurately responsive in accordance with the amount of rainfall, nor do prior art systems have the complete functions and accuracy and versatility of the control described and claimed in this instance.

Therefore, it will be understood that it is desired to have a control for watering sprinkling systems wherein the control may make the automatically operative system inoperative for a period of say two or three days after a certain quantity of rain has fallen. In these instances, it is common practice to have the controls installed for lawn and garden sprinkling and where the owner does not want to manually operate the system either because of the time required or because the owner may be away from the site for extended periods of time. With the present control, the system can fully operative in accord with the amount of rainfall so that, for instance, one-half inch of rain falls in one day, then the system might not operate to artifically water the area for the following three days. Still further, the control of this device is arranged so that if more than one-half inch of rain fell, say for instance as much as 2 inches of rain had fallen in one rain, then it would still be desirable to have the system operate again after the lapse of three days. This is so because the ground will absorb the 2 inches of rain as readily and rapidly as it will absorb the one-half inch of rain, and, in both instances of the quantities of rainfall as suggested, it is still desirable to have the system become operative again and function to sprinkle the area three days after the rainfall of either quantity.

Still further, it is an object and advantage of the present control to have the control responsive to the atmospheric conditions of moisture, and even to humidity conditions, and such conditions are similarly influential with respect to the ground to be sprinkled. That is, if the ground is inclined to dry rapidly after a minimum quantity of rain has fallen, then the system is also sensitive to the rapid drying conditions and it too will automatically respond to the drying conditions and thus have the sprinkling system function sooner than it would if the conditions were such that rapid drying was not occuring.

More generally, the objects and advantages of the present invention are to provide a reliable, efficient, simple and inexpensive, and accurate control for governing the function of an outdoor sprinkling system, and to do so without the requirement of the supervision of any attendant over an extended period of time, such as a number of weeks when the owner may be away from the property.

In accomplishing the aforementioned objects, the owner will of course save hundreds of dollars per year in the cost of water, and such savings are effected and are particularly significant where the water is expensive and not available in abundant supply. That is, without this system, the normal sprinkling system timer would be inclined to turn on the sprinkler at given intervals of time, and such times might be immediately after or even during a rain, even though the sprinkler should not be on at that time since the sprinkling water is not required at times when the rainfall is itself adequate for the watering desired.

Other objects and advantages will become apparent upon reading the following description in light of the accompanying drawings.

BRIEF DESCRIPTION OF THE DRAWINGS

FIG. 1 is a sectional view of a preferred embodiment of the control unit of this invention, and with the section being taken substantially along the line 1—1 of FIG. 2.

FIG. 2 is a top plan view of FIG. 1, with parts broken away and with the timer added thereto.

FIG. 3 is a sectional view of the accumulator cup used with this invention.

DETAILED DESCRIPTION OF THE PREFERRED EMBODIMENT

The drawings show the electric control, which, as seen in FIG. 2, electrically connects to a timer 10 or other control unit which in turn controls the valve for the water sprinkling system commonly used in these unattended sprinkling systems. Thus the timer 10 may be electrically operative and would turn the water on and off at said intervals of perhaps every several days, depending upon the action of the electric control described hereinafter.

The electric control is generally shown and is generally designated 11, and it includes a box-shaped housing 12 and an electric switch 13 which is influenced by piece 14 which is pivotally mounted in the nature of a balance beam. A water collecting cup 16 is on one end of the piece 14 which is pivoted at the pin 17 to the switch 13. An adjustable weight 18 is on the threaded end 19 of the piece 14, and the counterweight 18 may of course be adjustably positioned along the threaded end 19 for counterbalancing the weight of the piece 14, the cup 16, and other parts, and also counterbalancing the rain water which may be in the cup 16, as hereinafter described and with the so-called other parts being to the right side of the pin 17. Thus, the switch 13 may have an actuating button 21 which is under the influence of a spring 22, and, moving the button 21 upwardly would position the switch 13 in the electrically open position so that no current would flow through the switch 13. The switch open position would therefore be achieved when the cup 16 has rain water therein and then the balance beam 14 would be tipped in its opposite direction from that shown, that is, it would be tipped down on the right end where the cup 16 is attached to the piece 14. Of course the switch 13 has wire connecting screws 20 for receiving the wires 22' which are shown in the lower portion of the control housing 12 and which are only fragmatarily shown but it would be understood that the wires 22' extend to the connecting screws 20, in a conventional arrangement. Also, mounting screws 23 extend through a portion 24 of the housing 12 and the screws 23 extend through the switch 13 for mounting the switch in a fixed position on the housing 12.

It will therefore be understood that the beam 14 and the switch button 21 are normally in the position shown in FIG. 1, and that is when there is no rain water in the cup 16. This means that the normal position of the switch 13 is closed, so that there is a completed electric connection through the switch 13 and going to the electric timer 10. Of course when the beam 14 is pivoted to its other position so that the button 21 is pressed upwardly against the spring 22, then the switch 13 is open and there is then no electric connection for the flow of current to the timer 10 and the sprinkling system will not operate. Also, the beam threaded end 19 passes through a slot 26 in the housing wall 27, and the arrangement of the beam 14 and the parts thereon are such that the adjustable weight 18 cannot be positioned inwardly on the beam 19 to where the empty cup 16 will overbalance the beam end with the weight 18. That is, the arrangement is such that there is a limit for positioning the weight 18, and this limit assures that the beam 14 will always assume the tilted position shown in FIG. 1 when there is no weight in the cup 16, or only a little water.

A ventilation type of perforated metal guard 28 surrounds the rain cup 16 but permits the described and desired up-and-down movement of the cup 16. The guard 28 prevents debris, bugs, and the like from entering the cup 16 and affecting the pivoted position of the piece 14. However, the guard 28 permits circulation of air around the cup 16 so that the rain which accumulates in the cup 16 can be evaporated, as desired. At this time it will also be mentioned that the cup 16 is preferably provided with a water absorbing cylinder or like member 29 which is disposed within the cup 16 and which promotes the evaporation of the water from the cup 16. That is, the lower end of the evaporation member 29 would normally be immersed in the water in the cup 16, and the water would be absorbed up in the walls of the evaporation member 29 and then be evaporated from the cup 16, all as desired. Also, a stand pipe 31 extends through the cup bottom 32 and is slidably adjustable along the axis of the cylinder or pipe 31 to move up and down in the cup 16 and thus provide an adjustable member for the selection of the maximum quantity of rain water which can be collected in the cup 16. That is, the overflow tube 31 may be set for a one-half inch depth of rain water in the cup 16, and such setting would simply be accomplished by extending the tube 31 one-half inch above the cup base 32, such as that shown in FIG. 1. The rain water in excess of the one-half inch quantity would then simply flow through the tube 31 and downwardly and into a collector 33 which has a discharge tube 34 connected to it for directing the overflow rain away and to a remote point, as desired.

For directing the rain into the cup 16, an inlet tube 36 is attached to the top of the guard 28, and FIG. 2 shows that the inlet tube 36 is axially offset with respect to the overflow tube 31 so that the rain coming down in the tube 36 will properly accumulate in the cup 16 to the depth of the height of the tube 31 in the cup 16. A hose or tubing 37 is connected to the tube 36, at one end of the hose 37 as shown in FIG. 1, and the other end of the hose 37 is connected to an accumulator cup 38, as shown in FIG. 3. The cup 38 is shown to be of the same size as the cup 16, and the cup 38 may be affixed to a roof or some building exterior, by means of a connecting bracket 39, and the cup 38 then receives the rain falling into the cup 38.

It will therefore be understood that the rain collected in the accumulator cup 38 flows through the tubing 37 and into the cup 16, to the depth of the height of the tube 31 which is adjustable but fluid tight with the cup bottom 32. When sufficient weight of rain is accumulated in the cup 16, then the beam 14 is tipped to the other position from that shown in FIG. 1, and that opens the switch 13, as described. A half inch of rain in the cup 16, for an example of rain quantity, may be sufficient to tip the beam 14 and open the switch 13 so that the timer 10 is not electrically operative and the water sprinkling system will then not turn on. When the rain has evaporated from the cup 16, as least to a minimal amount, then the beam 14 will again tip to the position shown in FIG. 1 so that the switch 13 is closed and the timer 10 can then again be operated automatically. Of course the timer 10 can be set to operate every 3 or 4 days, or in any other interval of time which may be desired. Also, the cups 38 and 16 may be the same size so that the cup 38 would collect a standard one-half inch of rain, for instance, and such standard amount would also then be directed to the cup 16 without the determination of what amount of rain is necessary or desired for the described functioning of the electric control unit 11. Still further, an indicator light 41 may be electrically connected with the switch 13 to indicate the position of the electric setting of the switch 13, either in the open or closed position, as may be desired.

FIG. 2 does not show the evaporation cylinder 29 which may be a fibrous material highly water absorbing, but the unit is shown in FIG. 1 and is in the nature of an endless member extending around the cup 16 and adjacent the upright walls of the cup 16 for promoting evaporation of the rain from the cup 16.

Thus the control 11 may be disposed inside a garage or like enclosure, and the cup 38 would be exposed to the rain for collecting the rain, as described. It will be understood that when the switch 13 is in the electrically open position, then current is not flowing to the timer 10 so the timer 10 is not in condition for running and to be timing the lapsed time of say the three or four day interval. Only when the switch 13 is closed will there be current flowing to the timer 10 so that the timer 10 will be operating to regulate and time the 3-day interval. If the timer 10 were constantly operating, then, the switch 13 could actually be opened by the action of a rainfall, and, immediately upon evaporation of the rain from the cup 16, the timer might function to turn the sprinkler system on, though it would be doing so without adequate delay from the time of the rainfall.

What is claimed is:

1. A rain-responsive water sprinkling system electric control, comprising an electric timer for controlling the flow of water through a sprinkling system, an electric switch electrically connected to said timer and being operable to an electrically open position and to an electrically closed position, a pivot piece mounted for operating said switch to said open position in one direction of pivot of said pivot piece, a weight movably adjustably connected to said pivot piece to influence said pivot piece into the other direction of pivot, stop means disposed in the path of adjustment movement of said weight for limiting the adjustment of said weight in the direction toward a position where said weight would permit said switch to be in the open position, a cup on said pivot piece for influencing said pivot piece to said one direction of pivot to open said switch when water is in said cup, a water level governing means movably mounted in said cup for selection of the maximum quantity of water in said cup.

2. The control as claimed in claim 1, wherein said water level governing means is an over-flow tube uprightly positioned and extending through the bottom of said cup and being slidable axially of said tube for adjustable setting of the height of said tube in said cup.

3. The control as claimed in claim 1, including water evaporation means disposed in said cup for aiding in the evaporation of the water.

4. The control as claimed in claim 1, including a rain collector cup, a conduit connected to said collector cup and in water-flow communication with the first said cup for directing rain water to the first said cup, said conduit being offset from said water level governing means for directing rain water into said first cup and clear of direct deposit on said governing means.

5. The control as claimed in claim 4, wherein both said cups are the same cross-sectional size for accumulating the same quantity of rain water in any given depth of rain water in said cups.

6. The control as claimed in claim 4, including a rain water drain disposed below said first cup for receiving the over-flow therefrom and including a conduit for directing said over-flow away from said first cup.

* * * * *